United States Patent
Oh et al.

(10) Patent No.: US 7,375,719 B2
(45) Date of Patent: May 20, 2008

(54) METHOD AND APPARATUS FOR DRIVING LIQUID CRYSTAL DISPLAY

(75) Inventors: Eui Yeol Oh, Yongin-shi (KR); Hyun Seok Kim, Daegu-kwangyeokshi (KR); Min Ho Sohn, Gwangmyung-shi (KR); Ki Duk Kim, Gunpo-shi (KR)

(73) Assignee: LG. Philips LCD. Co., Ltd, Seoul (KR)

( * ) Notice: Subject to any disclaimer, the term of this patent is extended or adjusted under 35 U.S.C. 154(b) by 692 days.

(21) Appl. No.: 10/871,948

(22) Filed: Jun. 18, 2004

(65) Prior Publication Data
US 2005/0140639 A1 Jun. 30, 2005

(30) Foreign Application Priority Data
Dec. 29, 2003 (KR) .................. 10-2003-0099246

(51) Int. Cl.
*G09G 3/36* (2006.01)
(52) U.S. Cl. .................. 345/102; 345/87; 345/89; 345/103; 345/211; 345/212; 345/690
(58) Field of Classification Search .................. 345/87, 345/89, 102, 211–213, 204, 690
See application file for complete search history.

(56) References Cited

U.S. PATENT DOCUMENTS

| | | | |
|---|---|---|---|
| 5,717,422 A | 2/1998 | Fergason | |
| 6,762,742 B2 | 7/2004 | Moon et al. | |
| 6,850,214 B2 * | 2/2005 | Nishitani et al. | 345/87 |
| 7,113,163 B2 * | 9/2006 | Nitta et al. | 345/102 |
| 2001/0033260 A1 | 10/2001 | Nishitani et al. | |
| 2002/0008694 A1 * | 1/2002 | Miyachi et al. | 345/204 |
| 2002/0057238 A1 | 5/2002 | Nitta et al. | |
| 2002/0118161 A1 | 8/2002 | Lin | |
| 2003/0002736 A1 | 1/2003 | Maruoka et al. | |
| 2003/0222841 A1 * | 12/2003 | Hirosue | 345/89 |

FOREIGN PATENT DOCUMENTS

| | | |
|---|---|---|
| EP | 1 111 578 | 6/2001 |
| EP | 1223570 A23 | 6/2001 |
| EP | 1 213 699 | 6/2002 |
| EP | 1 255 241 | 11/2002 |

(Continued)

OTHER PUBLICATIONS

Office Action dated Apr. 10, 2006, for corresponding German Patent Application No. 10 2004 030 556.0-32.

*Primary Examiner*—Richard Hjerpe
*Assistant Examiner*—Jennifer T Nguyen
(74) *Attorney, Agent, or Firm*—Brinks Hofer Gilson & Lione

(57) ABSTRACT

A driving method and apparatus for a liquid crystal display for minimizing motion blur in a moving picture as well as displaying a fresh and dynamic image is disclosed. In the driving method, data inputted from the exterior are converted into brightness components to produce a histogram for each frame. A control value is extracted from various characteristics of the histogram. Turn-on times of a plurality of lamps positioned in such a manner to overlap with a liquid crystal display panel are controlled in correspondence with the control value.

70 Claims, 11 Drawing Sheets

FOREIGN PATENT DOCUMENTS

| | | |
|---|---|---|
| JP | 06-268866 | 9/1994 |
| JP | 2002055664 | 2/2002 |
| KR | 2002-73353 | 5/2002 |
| KR | 2003-32018 | 5/2002 |
| WO | WO 03/032288 | 4/2003 |

* cited by examiner

METHOD AND APPARATUS FOR DRIVING LIQUID CRYSTAL DISPLAY

This application claims the benefit of the Korean Patent Application No. P2003-99246 filed in Korea on Dec. 29, 2003, which is hereby incorporated by reference.

BACKGROUND OF THE INVENTION

1. Field of the Invention

This invention relates to a liquid crystal display, and more particularly to a driving method and apparatus for a liquid crystal display that is adaptive for minimizing a motion blur phenomenon from a moving picture as well as displaying a fresh and dynamic image.

2. Description of the Related Art

Generally, a liquid crystal display (LCD) controls light transmittance of liquid crystal cells in accordance with video signals to thereby display a picture. Such an LCD has been implemented by an active matrix type having a switching device for each cell, and applied to a display device such as a monitor for a computer, office equipments, a cellular phone and the like. The switching device for the active matrix LCD mainly employs a thin film transistor (TFT).

FIG. 1 schematically shows a conventional LCD driving apparatus.

Referring to FIG. 1, the conventional LCD driving apparatus includes a liquid crystal display panel 2 having mxn liquid crystal cells Clc arranged in a matrix type, m data lines D1 to Dm and n gate lines G1 to Gn intersecting each other and thin film transistors TFT provided at the intersections, a data driver 4 for applying data signals to the data lines D1 to Dm of the liquid crystal display panel 2, a gate driver 6 for applying scanning signals to the gate lines G1 to Gn, a gamma voltage supplier 8 for supplying the data driver 4 with gamma voltages, a timing controller 10 for controlling the data driver 4 and the gate driver 6 using synchronizing signals from a system 20, a direct current to direct current converter 14, hereinafter referred to as "DC/DC converter", for generating voltages supplied to the liquid crystal display panel 2 using a voltage from a power supply 12, and an inverter 16 for driving a back light 18.

The system 20 applies vertical/horizontal signals Vsync and Hsync, clock signals DCLK, a data enable signal DE and data R, G and B to the timing controller 10.

The liquid crystal display panel 2 includes a plurality of liquid crystal cells Clc arranged, in a matrix type, at the intersections between the data lines D1 to Dm and the gate lines G1 to Gn. The thin film transistor TFT provided at each liquid crystal cell Clc applies a data signal from each data line D1 to Dm to the liquid crystal cell Clc in response to a scanning signal from the gate line G. Further, each liquid crystal cell Clc is provided with a storage capacitor Cst. The storage capacitor Cst is provided between a pixel electrode of the liquid crystal cell Clc and a pre-stage gate line or between the pixel electrode of the liquid crystal cell Clc and a common electrode line, to thereby constantly keep a voltage of the liquid crystal cell Clc.

The gamma voltage supplier 8 applies a plurality of gamma voltages to the data driver 4.

The data driver 4 converts digital video data R, G and B into analog gamma voltages (i.e., data signals) corresponding to gray level values in response to a control signal CS from the timing controller 10, and applies the analog gamma voltages to the data lines D1 to Dm.

The gate driver 6 sequentially applies a scanning pulse to the gate lines G1 to Gn in response to a control signal CS from the timing controller 10 to thereby select horizontal lines of the liquid crystal display panel 2 supplied with the data signals.

The timing controller 10 generates the control signals CS for controlling the gate driver 6 and the data driver 4 using the vertical/horizontal synchronizing signals Vsync and Hsync and the clock signal DCLK inputted from the system 20. Herein, the control signal CS for controlling the gate driver 6 is comprised of a gate start pulse GSP, a gate shift clock GSC and a gate output enable signal GOE, etc. Further, the control signal CS for controlling the data driver 4 is comprised of a source start pulse SSP, a source shift clock SSC, a source output enable signal SOE and a polarity signal POL, etc. The timing controller 10 re-aligns the data R, G and B from the system 20 to apply them to the data driver 4.

The DC/DC converter 14 boosts or drops a voltage of 3.3V inputted from the power supply 12 to generate a voltage supplied to the liquid crystal display panel 2. Such a DC/DC converter 14 generates a gamma reference voltage, a gate high voltage VGH, a gate low voltage VGL and a common voltage Vcom.

The inverter 16 applies a driving voltage (or driving current) for driving the back light 18 to the back light 18. The back light 18 generates a light corresponding to the driving voltage (or driving current) from the inverter 16 to apply it to the liquid crystal display panel 2.

In order to display a vivid image at the liquid crystal display panel 2 driven in this manner, a distinct contrast between brightness and darkness is made in correspondence with data supplied to the liquid crystal display panel 2. However, since the conventional back light 18 produces constant brightness irrespective of the data supplied, it is difficult to display dynamic and fresh images.

SUMMARY OF THE INVENTION

Accordingly, a driving method and apparatus for a liquid crystal display is provided that is adaptive for minimizing motion blur in a moving picture as well as displaying fresh and dynamic images.

A method of driving a liquid crystal display according to one aspect of the present invention includes (A) converting data inputted from the exterior into brightness components to produce a histogram for each frame; (B) extracting a control value from the histogram; and (C) controlling turn-on times of a plurality of lamps positioned to overlap with a liquid crystal display panel in correspondence with the control value.

In the method, turn-on times of the lamps increase as a gray level of the control value increases and decrease as a gray level of the control value decrease.

The gray level of the control value is divided into a plurality of areas in which the turn-on times of the lamps are set differently for each area.

The gray level area of the control value is divided into a minimum area including low gray levels, a middle area including middle gray levels and a maximum area including high gray levels.

When the control value is positioned in the middle area, turn-on times of the lamps are set to a first time interval.

When the control value is positioned in the minimum area, the lamps are turned on during a time shorter than the first time interval.

When the control value is positioned in the minimum area, the turn-on time is controlled in proportion to a gray level of the control value.

When the control value is positioned in the maximum area, the lamps are turned on during a time longer than the first time interval.

When the control value is positioned in the maximum area, the turn-on time is controlled in proportion to a gray level of the control value.

The lamps are sequentially turned on.

The control value is selected from an average value representing an average of the histogram gray level or a most-frequent value occupying the highest frequency number in the histogram.

When the most-frequent value is selected as the control value, the frequency number of the most-frequent value is determined to select the control value from the previous most-frequent value or the current most-frequent value.

The previous most-frequent value is selected as the control value when the frequency number of the current most-frequent value is set to less than 40% of the entire pixel, whereas the current most-frequent value is selected as the control value in the other case.

In the method, a plurality of image determination factors is extracted from the histogram, a weighting value assigned to the image determination factors; and the control value generated using the image determination factors to which the weighting value has been assigned.

When an average value representing an average of the histogram gray level, a most-frequent value occupying the highest frequency number in the histogram and a gray level value of the histogram are listed in accordance with the frequency number, the image determination factors include a middle-position value located at the middle portion, a maximum gray level value of the histogram, a minimum gray level value of the histogram, a range value representing a range between the maximum gray level value and the minimum gray level value and an intermediate value between the maximum gray level value and the minimum gray level value.

The assigning the weighting value includes assigning a high weighting value to the average value and the most-frequent value; assigning a weighting value lower than the average value and the most-frequent value to the range value; and assigning a weighting value lower than the range value to the minimum gray level value, the maximum gray level value, the middle-position value and the intermediate value.

The generating the control value includes generating the control value by summing the image determination factors to which the weighting values have been assigned and then dividing the summed value by the number of the image determining factors.

The method further includes generating modulated brightness components having an expanded contrast using the histogram; and generating an output data using the modulated brightness components.

A driving apparatus for a liquid crystal display according to another aspect of the present invention includes a brightness/color separator for converting data inputted from the exterior into brightness components and chrominance components; a histogram analyzer for converting the brightness components into a histogram for each frame; and a back light controller for controlling turn-on times of a plurality of lamps using the analyzed histogram from the histogram analyzer.

The driving apparatus further includes an inverter for controlling turn-on times of the plurality of lamps in response to the brightness control signal from the back light controller.

The inverter sequentially turns on the plurality of lamps.

The back light controller includes a control value extractor for extracting a control value from the histogram; and a back light control for generating the brightness control signal in correspondence with the extracted control value from the control value extractor.

The back light control generates the brightness control signal such that turn-on times of the lamps are increased as a gray level of the control value increases while turn-on times of the lamps are decreased as a gray level of the control value is decreased.

The back light control generates the brightness control signal such that a gray level of the control value is divided into a plurality of areas and turn-on times of the lamps is set differently in each area.

The back light control divides the gray level of the control value into a minimum area including low gray levels, a middle area including middle gray levels and a maximum area including high gray levels.

Herein, when the control value from the control value extractor is positioned in the middle area, the back light control generates the brightness control signal such that turn-on times of the lamps are set to a first time interval.

When the control value from the control value extractor is positioned in the minimum area, the back light control generates the brightness control signal such that the lamps are turned on during a time shorter than the first time interval.

When the control value is positioned in the minimum area, the back light control generates the brightness control signal such that the turn-on time is controlled in proportion to a gray level of the control value.

When the control value from the control value extractor is positioned in the maximum area, the back light control generates the brightness control signal such that the lamps are turned on during a time longer than the first time interval.

When the control value is positioned in the maximum area, the back light controller generates the brightness control signal such that the turn-on time is controlled in proportion to a gray level of the control value.

The control value extractor extracts a most-frequent value occupying the highest frequency number in the histogram.

The control value extractor selects the previous most-frequent value as the control value when the frequency number of the currently extracted most-frequent value is set to less than 40% of the entire pixel, whereas it selects the currently extracted most-frequent value as the control value in the other case.

The back light controller includes a control value generator for extracting a plurality of image determination factors from the histogram and for generating the control value using the image determination factors; a weighting value assigner for assigning a weighting value to the plurality of image determination factors; and a back light control for generating a control value using the image determination factors in correspondence with the control value from the control value generator.

Herein, the control value generator extracts an average value representing an average of the histogram gray level, a most-frequent value occupying the highest frequency number in the histogram and a gray level value of the histogram are listed in accordance with the frequency number, the image determination factors include a middle-position value located at the middle portion, a maximum gray level value of the histogram, a minimum gray level value of the histogram, a range value representing a range between the maximum gray level value and the minimum gray level value and an intermediate value between the maximum gray level value and the minimum gray level value.

The weighting value assigner assigns a high weighting value to the average value and the most-frequent value; assigning a weighting value lower than the average value and the most-frequent value to the range value; and assigning a weighting value lower than the range value to the minimum gray level value, the maximum gray level value, the middle-position value and the intermediate value.

The control value generator generates the control value by summing the image determination factors to which the weighting values have been assigned and then dividing the summed value by the number of the image determining factors.

The driving apparatus further includes a data processor for generating modulated brightness components having an expanded contrast using the analyzed histogram from the histogram analyzer; delay means for the chrominance components until the modulated brightness components are generated from the data processor; and a brightness/color mixer for generating an output data using the modulated brightness components and the delayed chrominance components from the delay means.

BRIEF DESCRIPTION OF THE DRAWINGS

Different embodiments of the invention will be apparent from the following detailed description with reference to the accompanying drawings, in which.

DETAILED DESCRIPTION OF THE PREFERRED EMBODIMENT

Figure 1:
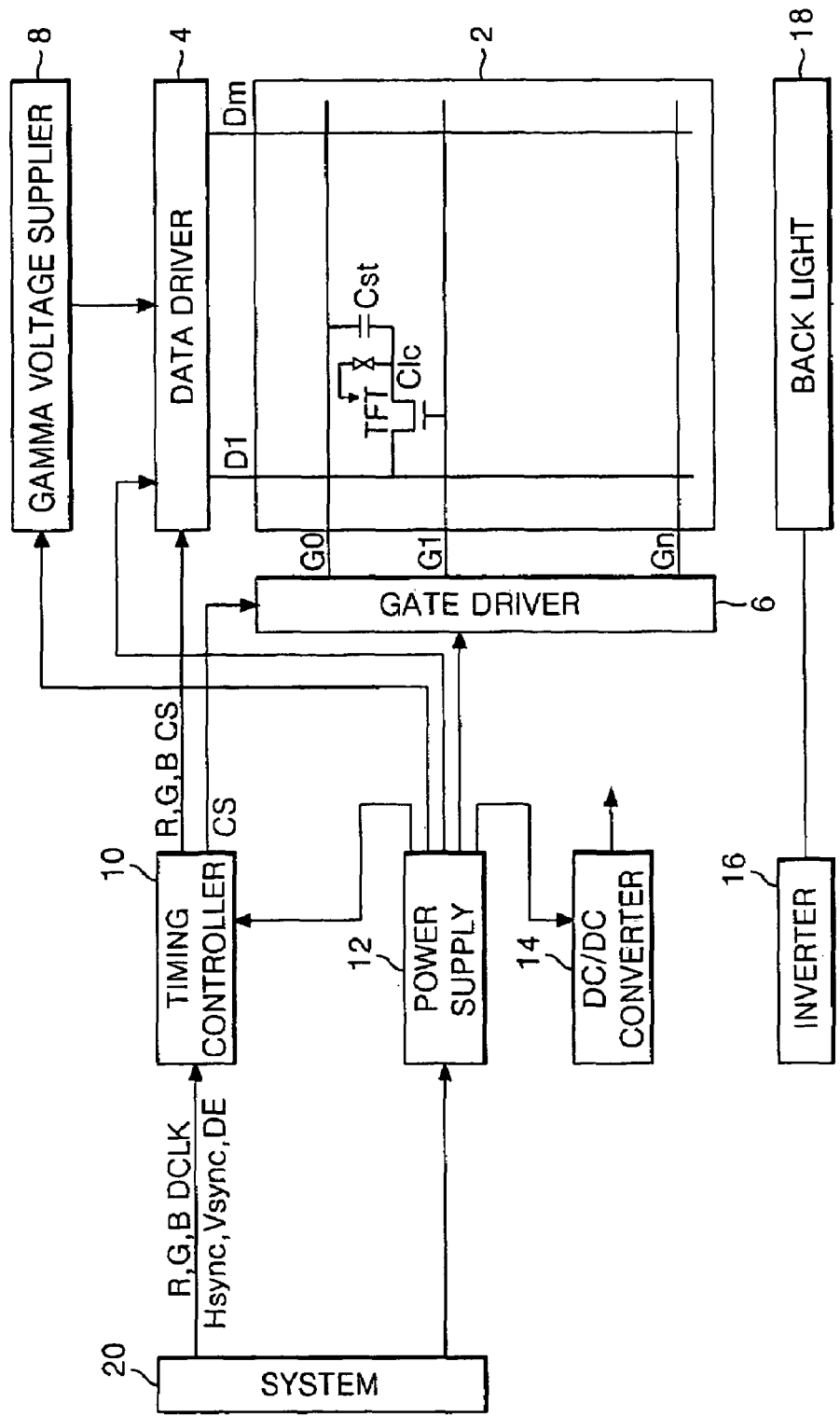
FIG. 1 is a schematic block diagram showing a configuration of a conventional driving apparatus for a liquid crystal display.
Figure 2:
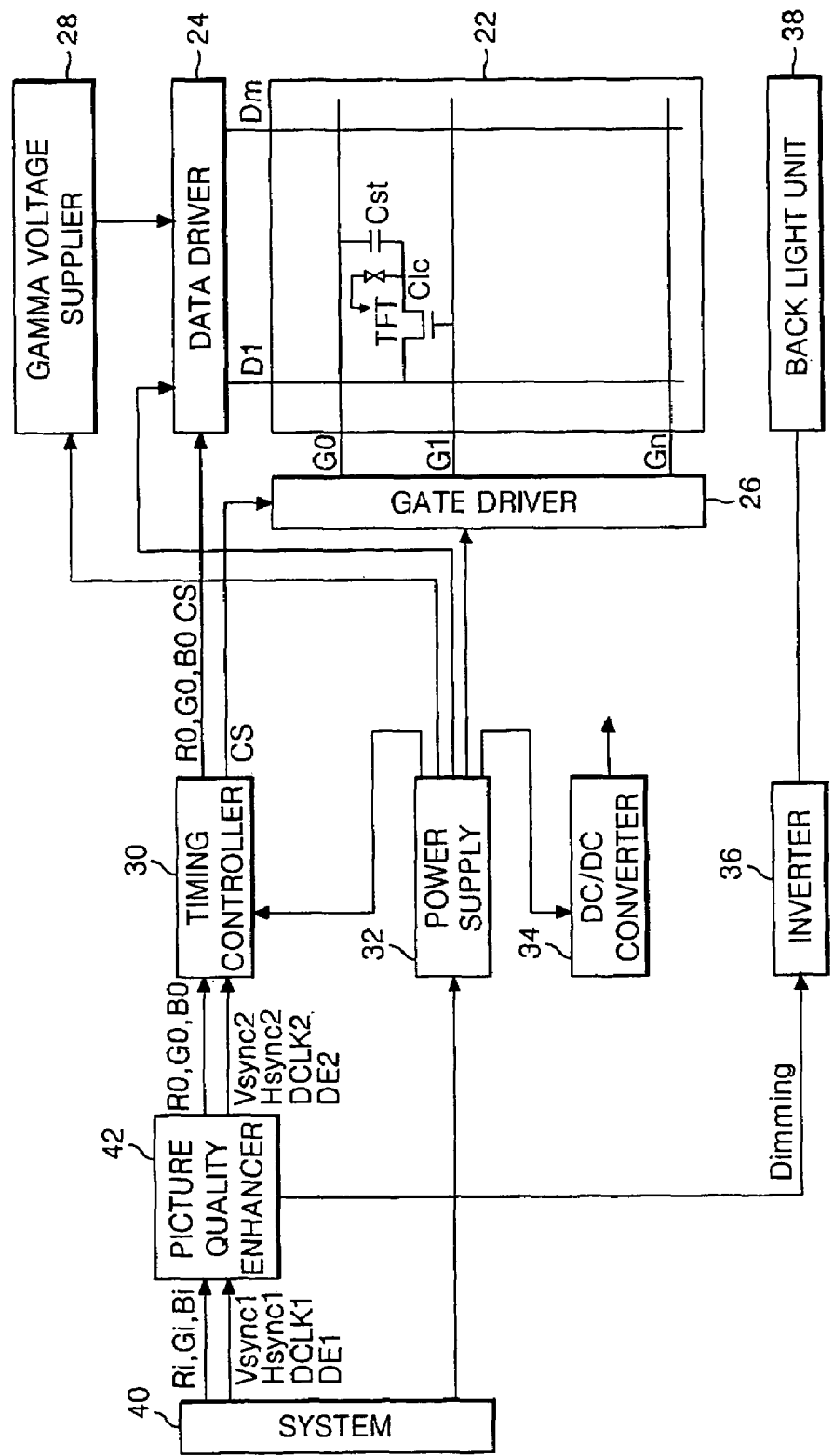
FIG. 2 is a schematic block diagram showing a configuration of a driving apparatus for a liquid crystal display according to an embodiment of the present invention.

FIG. 2 schematically shows a driving apparatus for a liquid crystal display (LCD) according to an embodiment of the present invention.

Referring to FIG. 2, the LCD driving apparatus according to the embodiment of the present invention includes a liquid crystal display panel 22 having m×n liquid crystal cells Clc arranged in a matrix type, m data lines D1 to Dm and n gate lines G1 to Gn intersecting each other and thin film transistors TFT provided at the intersections, a data driver 24 for applying data signals to the data lines D1 to Dm of the liquid crystal display panel 22, a gate driver 26 for applying scanning signals to the gate lines G1 to Gn, a gamma voltage supplier 28 for supplying the data driver 24 with gamma voltages, a timing controller 30 for controlling the data driver 24 and the gate driver 26 using a second synchronizing signal from a picture quality enhancer 42, a DC/DC converter 34 for generating voltages supplied to the liquid crystal display panel 22 using a voltage from a power supply 32, an inverter 36 for driving a back light unit 38, and a picture quality enhancer 42 for selectively emphasizing a contrast of input data and for applying a brightness control signal Dimming corresponding to the input data to the inverter 36.

The system 40 applies first vertical/horizontal signals Vsync1 and Hsync1, a first clock signal DCLK1, a first data enable signal DE1 and first data Ri, Gi and Bi to the picture quality enhancer 42.

The liquid crystal display panel 22 includes a plurality of liquid crystal cells Clc arranged, in a matrix type, at the intersections between the data lines D1 to Dm and the gate lines G1 to Gn. The thin film transistor TFT provided at each liquid crystal cell Clc applies a data signal from each data line D1 to Dm to the liquid crystal cell Clc in response to a scanning signal from the gate line G. Further, each liquid crystal cell Clc is provided with a storage capacitor Cst. The storage capacitor Cst is provided between a pixel electrode of the liquid crystal cell Clc and a pre-stage gate line or between the pixel electrode of the liquid crystal cell Clc and a common electrode line, to thereby constantly keep a voltage of the liquid crystal cell Clc.

The gamma voltage supplier 28 applies a plurality of gamma voltages to the data driver 24.

The data driver 24 converts digital video data R, G and B into analog gamma voltages (i.e., data signals) corresponding to gray level values in response to a control signal CS from the timing controller 30, and applies the analog gamma voltages to the data lines D1 to Dm.

The gate driver 26 sequentially applies a scanning pulse to the gate lines G1 to Gn in response to a control signal CS from the timing controller 30 to thereby select horizontal lines of the liquid crystal display panel 22 supplied with the data signals.

The timing controller 30 generates the control signals CS for controlling the gate driver 26 and the data driver 24 using second vertical/horizontal synchronizing signals Vsync2 and Hsync2 and a second clock signal DCLK2 inputted from the picture quality enhancer 42. The control signal CS for controlling the gate driver 26 is comprised of a gate start pulse GSP, a gate shift clock GSC and a gate output enable signal GOE, etc. Further, the control signal CS for controlling the data driver 24 is comprised of a source start pulse SSP, a source shift clock SSC, a source output enable signal SOE and a polarity signal POL, etc. The timing controller 30 re-aligns second data Ro, Go and Bo from the picture quality enhancer 42 to apply them to the data driver 24.

The DC/DC converter 34 boosts or drops a voltage of 3.3V inputted from the power supply 32 to generate a voltage supplied to the liquid crystal display panel 22. Such a DC/DC converter 14 generates a gamma reference voltage, a gate high voltage VGH, a gate low voltage VGL and a common voltage Vcom.

Figure 3:
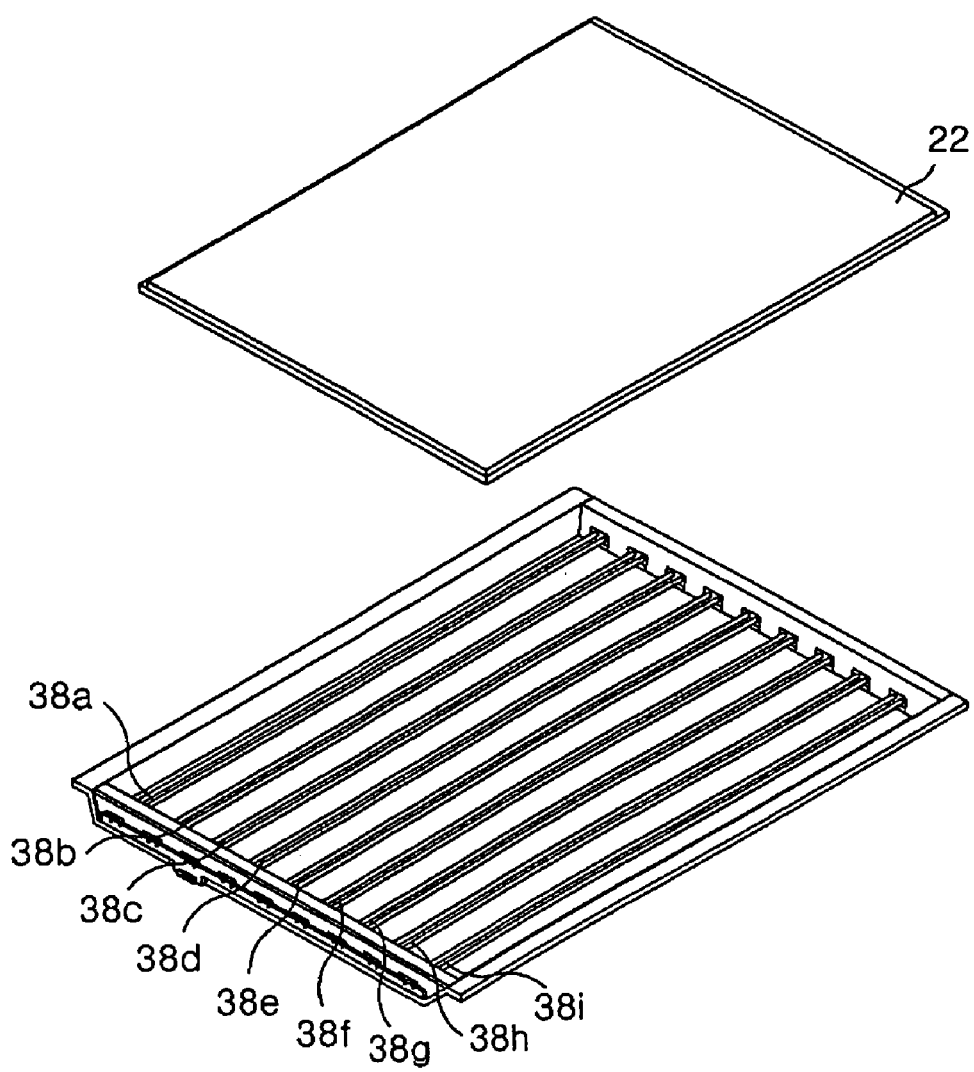
FIG. 3 shows a plurality of back lights included in the back light unit shown in FIG. 2.

The back light unit 38 is comprised of a plurality of back lights 38a to 38i that overlap with the liquid crystal display panel 22 as shown in FIG. 3. The back lights 38a to 38i directly apply light to the front side of the liquid crystal display panel 22 under control of the inverter 36.

The inverter 36 applies a driving signal (e.g., PWM) to each of the back lights 38a to 38i included in the back light unit 38 control activation/deactivation of the back lights 38a to 38*i*. In this case, the inverter 36 sequentially turns on the back lights 38*a* to 38*i* so that motion blur can be minimized. If the back lights 38*a* to 38*i* are sequentially turned on, then it becomes possible to minimize the motion blur.

Figure 4:
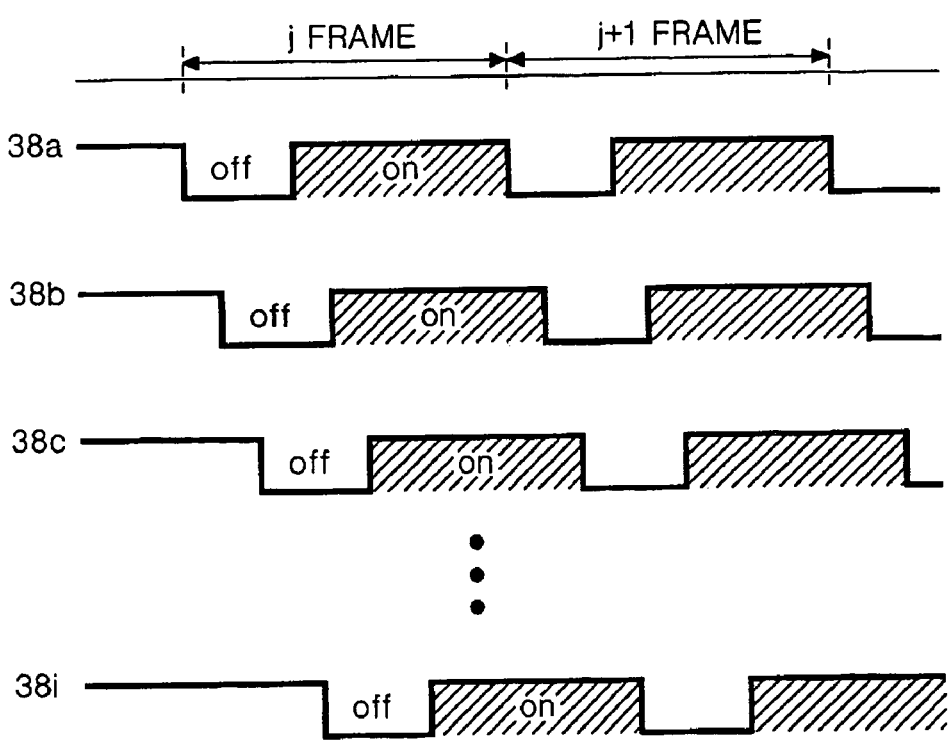
FIG. 4 depicts a sequential turning-on of the back lights shown in FIG. 3.

More specifically, when a moving picture is displayed on a cathode ray tube (CRT), motion blur is not generated. In other words, since the CRT does not have a hold characteristic of keeping a picture, it does not generate motion blur. On the other hand, since the liquid crystal display panel has a hold characteristic of keeping data signals (i.e., a sustaining characteristic of a liquid crystal), it generates motion blur in which a displayed picture is dimly viewed. Accordingly, the present embodiment sequentially turns on the back lights 38*a* to 38*i* as shown in FIG. 4, thereby minimizing motion blur from the liquid crystal display panel 22. The inverter 38 controls turn-on times of the back lights 38*a* to 38*i* in response to a brightness control signal Dimming from the picture quality enhancer 42 as will be described in detail later. A turn-on time is the time the back light is on, rather than the rise time for the back light to transition from the off to the on state.

The picture quality enhancer 42 extracts brightness components for each frame using the first data Ri, Gi and Bi from the system 40, and generates the second data Ro, Go and Bo obtained by a change in gray level values of the first data Ri, Gi and Bi in correspondence with the extracted brightness components for each frame. In this case, the picture quality enhancer 42 generates the second data Ro, Go and Bo such that the contrast is expanded with respect to the input data Ri, Gi and Bi.

The picture quality enhancer 42 also generates a brightness control signal Dimming corresponding to brightness components to apply it to the inverter 36. To accomplish this, the picture quality enhancer 42 extracts a control value capable of controlling the back light (e.g., most frequent value, that is, a gray level value existing in one frame most frequently) from the brightness components, and generates the brightness control signal Dimming using the extracted control value.

Moreover, the picture quality enhancer 42 generates second vertical/horizontal synchronizing signals Vsync2 and Hsync2, a second clock signal DCLK2 and a second data enable signal DE2 synchronized with the second data Ro, Go and Bo with the aid of the first vertical/horizontal synchronizing signals Vsync1 and Hsync1, the first clock signal DCLK1 and the first data enable signal DE1 inputted from the system 40.

Figure 5:
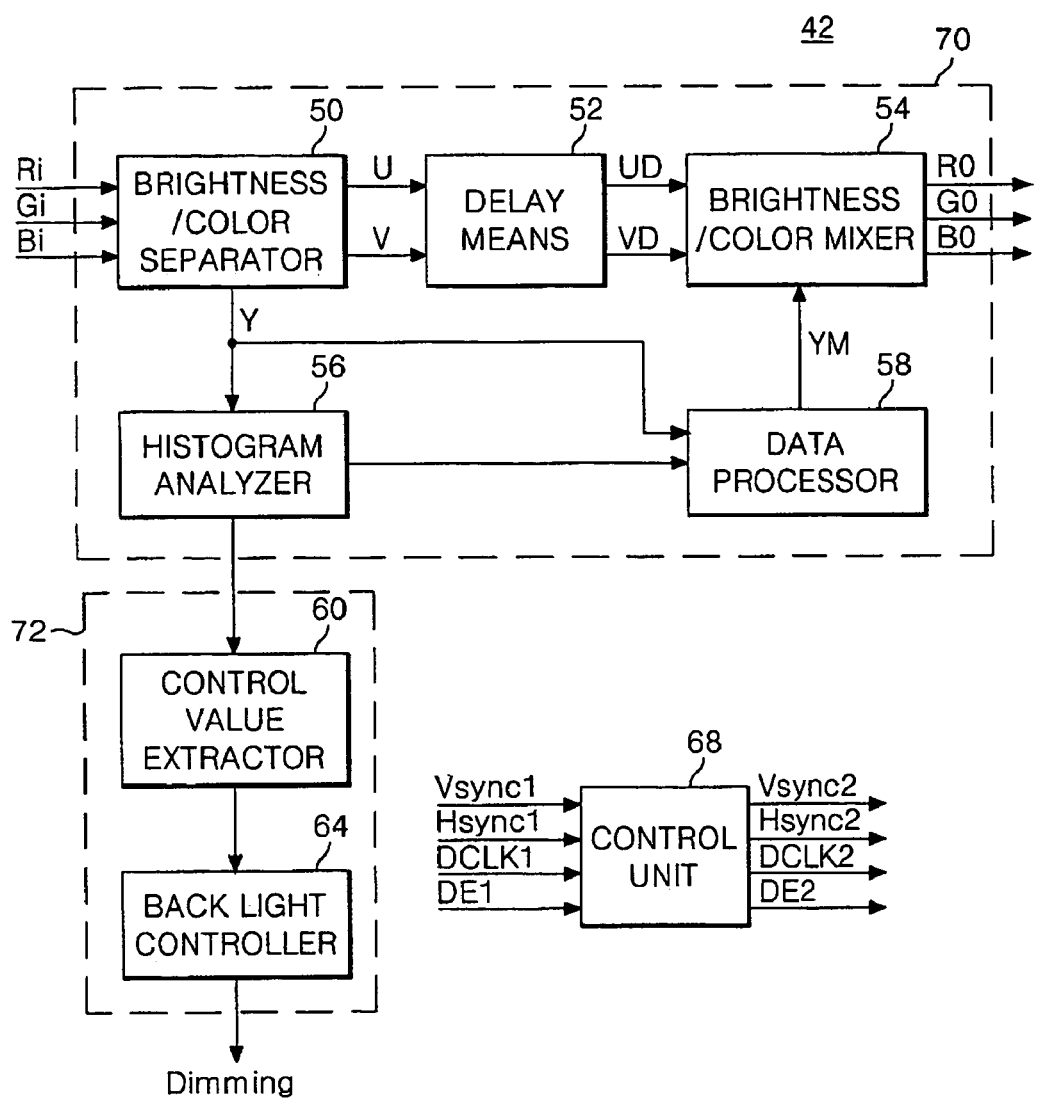
FIG. 5 is a detailed block diagram of the picture quality enhancer shown in FIG. 2.

To this end, as shown in FIG. 5, the picture quality enhancer 42 includes an image signal modulator 70 for generating the second data Ro, Go and Bo using the first data Ri, Gi and Bi, a back light control unit 72 for generating the brightness control signal Dimming under control of the image signal modulator 70, and a control unit 68 for generating the second vertical/horizontal synchronizing signals Vsync2 and Hsync2, the second clock signal DCLK2 and the second enable signal DE2.

The image signal modulator 70 extracts brightness components Y from the first data Ri, Gi and Bi, and generates second data Ro, Go and Bo in which a contrast is partially emphasized with the aid of the extracted brightness components Y. To this end, the image signal modulator 70 includes a brightness/color separator 50, a delay 52, a brightness/color mixer 54, a histogram analyzer 56 and a data processor 58.

The brightness/color separator 50 separates the first data Ri, Gi and Bi into brightness components Y and chrominance components U and V. Herein, the brightness components Y and the chrominance components U and V are obtained by the following equations:

$$Y = 0.229 \times Ri + 0.587 \times Gi + 0.114 \times Bi \quad (1)$$

$$U = 0.493 \times (Bi - Y) \quad (2)$$

$$V = 0.887 \times (Ri - Y) \quad (3)$$

Figure 6:
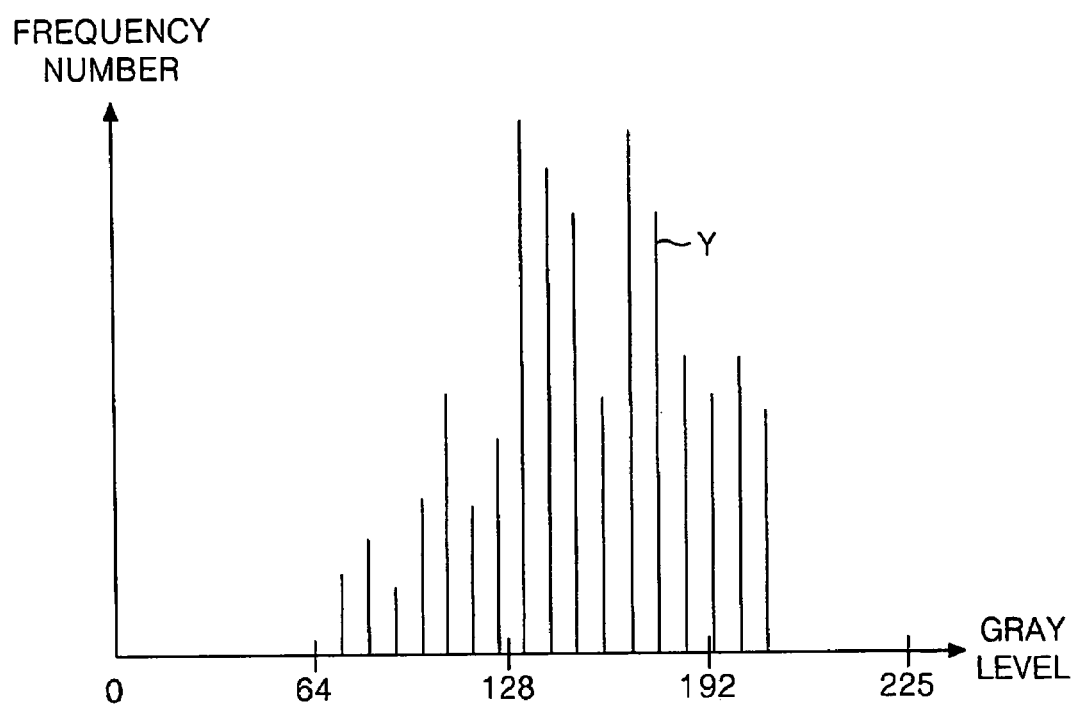
FIG. 6 illustrates an example of a histogram generated from the histogram analyzer shown in FIG. 5.

The histogram analyzer 56 divides the brightness components Y into gray levels for each frame. In other words, the histogram analyzer 56 arranges the brightness components Y for each frame to correspond to the gray levels, thereby obtaining a histogram as shown in FIG. 6. Thus, the shape of the histogram is established in correspondence with brightness components of the first data Ri, Gi and Bi.

The data processor 58 generates modulated brightness components YM having an emphasized contrast using the analyzed histogram from the histogram analyzer 56. The data processor 58 generates modulated brightness components YM by various methods. These methods include those disclosed in Korean Patent Applications Nos. 2003-036289, 2003-040127, 2003-041127, 2003-80177, 2003-81171, 2003-81172, 2003-81173 and 2003-81175 filed by the applicants, which are herein incorporated by reference in their entirety into the above-mentioned modulating method of the data processor 58 such that the contrast can be expanded. In addition, the data processor 58 can generate the modulated brightness components YM having an emphasized contrast by utilizing other known methods.

The delay 52 delays chrominance components U and V until the brightness components YM modulated by the data processor 58 are produced. Then, the delay 52 applies the delayed chrominance components UD and VD synchronized with the modulated brightness components YM to the brightness/color mixer 54.

The brightness/color mixer 54 generates second data Ro, Go and Bo with the aid of the modulated brightness components YM and the delayed chrominance components UD and VD. Herein, the second data Ro, Go and Bo is obtained by the following equations:

$$Ro = YM + 0.000 \times UD + 1.140 \times VD \quad (4)$$

$$Go = YM - 0.396 \times UD - 0.581 \times VD \quad (5)$$

$$Bo = YM + 2.029 \times UD + 0.000 \times VD \quad (6)$$

Since the second data Ro, Go and Bo obtained by the brightness/color mixer 54 has been produced from the modulated brightness components YM having an expanded contrast, they have more expanded contrast than the first data Ri, Gi and Bi. The second data Ro, Go and Bo produced such that the contrast can be expanded as mentioned above is applied to the timing controller 30.

The control unit 68 receives the first vertical/horizontal synchronizing signals Vsync1 and Hsync1, the first clock signal DCLK1 and the first data enable signal DE1 from the system 40. Further, the controller 68 generates the second vertical/horizontal synchronizing signals Vsync2 and Hsync2, the second clock signal DCLK2 and the second data enable signal DE2 to be synchronized with the second data Ro, Go and Bo, and applies them to the timing controller 30.

The back light control unit 72 extracts a control value from the histogram analyzer 56, and generates a brightness control signal Dimming using the extracted control value. The control value can be selected from a most frequent value or an average value representing an average gray level of the histogram.

The back light control unit 72 includes a control value extractor 60 and a back light controller 64. The control value extractor 60 extracts the most-frequent value or the average value from the histogram, and applies the extracted most-frequent value or average value to the back light controller 64 as a gray level value. If the most-frequent value is used as the control value, the control value extractor 60 selects the previous most-frequent value or the current most-frequent value dependent upon the frequency of the most-frequent value. In one embodiment, the control value extractor 60 selects a gray level corresponding to the previous most-frequent value as the control value when the frequency of the currently extracted most-frequent value is less than 40% of the total number of values in the histogram and selects a gray level having the currently extracted most-frequent value when the frequency of the currently extracted most-frequent value is 40% or greater of the entire number of pixels.

The back light controller 64 generates a brightness control signal Dimming such that light having brightness corresponding to the control value can be supplied, to thereby apply it to the inverter 36. In this case, the back light control establishes increased turn-on times of the back lights 38a to 38i as the control value increases, whereas it establishes shorter turn-on times of the back lights 38a to 38i as the control value decreases.

Figure 7A:
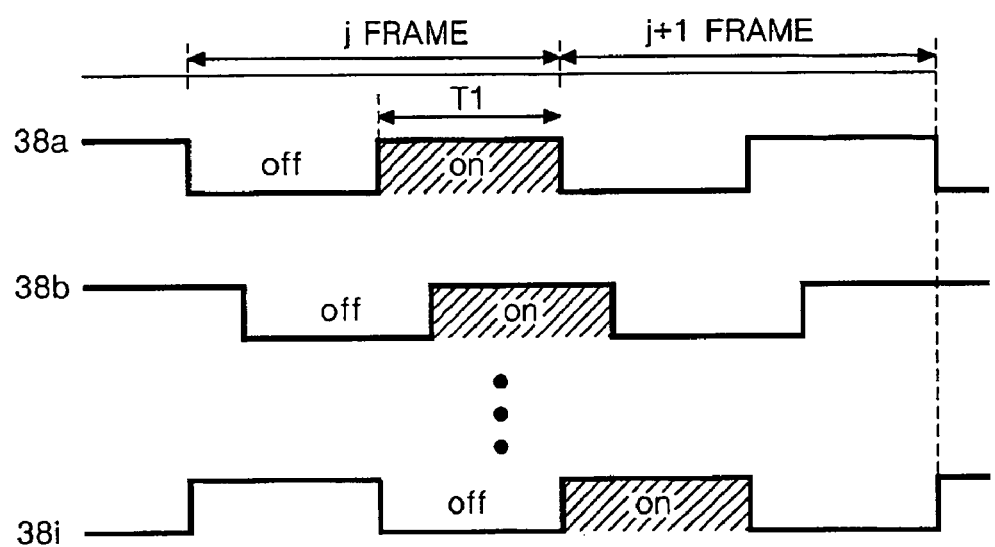
FIG. 7A and FIG. 7B show turn-on times of the back lights changed in correspondence with a control value.

More specifically, firstly, the back light controller 64 generates a brightness control signal Dimming such that turn-on times of the back lights 38a to 38i can be set to a first time interval T1 as shown in FIG. 7A when the control value has a low gray level, and applies it to the inverter 36. Then, the inverter 36 sequentially turns on and off the back lights 38a to 38i such that turn-on times of the back lights 38a to 38i have the first time interval T1.

Figure 7B:
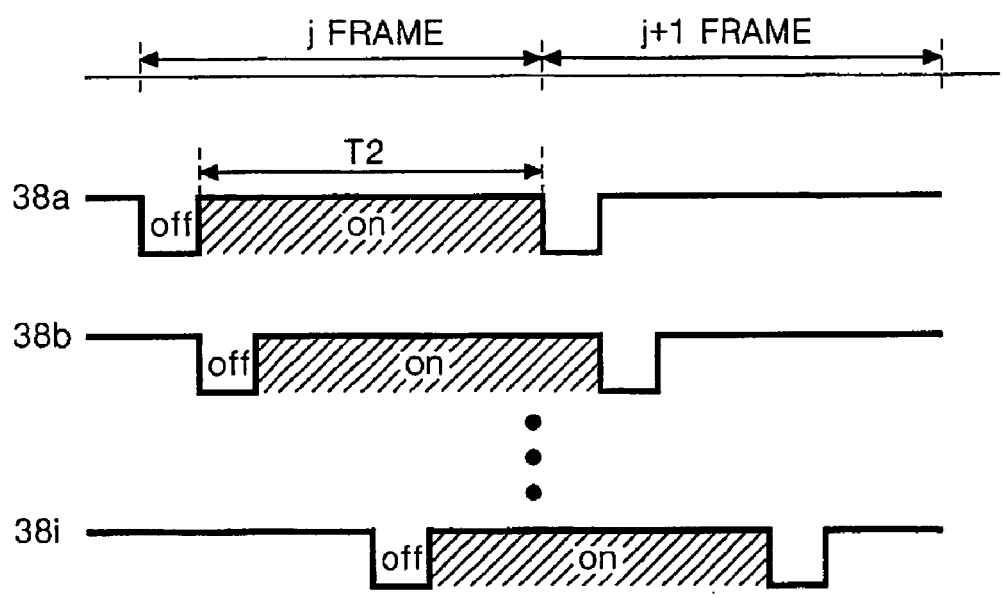

The back light controller 64 generates a brightness control signal Dimming such that turn-on times of the back lights 38a to 38i can be set to a second time interval T2 (e.g., a time interval shorter than one frame interval) having a larger width than the first time interval T1 as shown in FIG. 7B when the control value has a high gray level, and applies it to the inverter 36. Then, the inverter 36 sequentially turns on and off such that turn-on times of the back lights 38a to 38i have the second time interval T2. The controller 64 sets turn-on times of the back lights 38a to 38i in proportion to the control value.

As described above, the present embodiment generates a histogram using brightness components for one frame and generates the second data Ro, Go and Bo having an emphasized contrast using the histogram, so that it can display more vivid image than previous LCDs. Furthermore, the present embodiment extracts a control value from an average histogram and controls brightness of the back lights 38a to 38i with the aid of the extracted control value, thereby displaying more dynamic and fresh images than previous LCDs. Moreover, the present embodiment sequentially turns on the back lights 38a to 38i, thereby minimizing motion blur.

Figure 8:
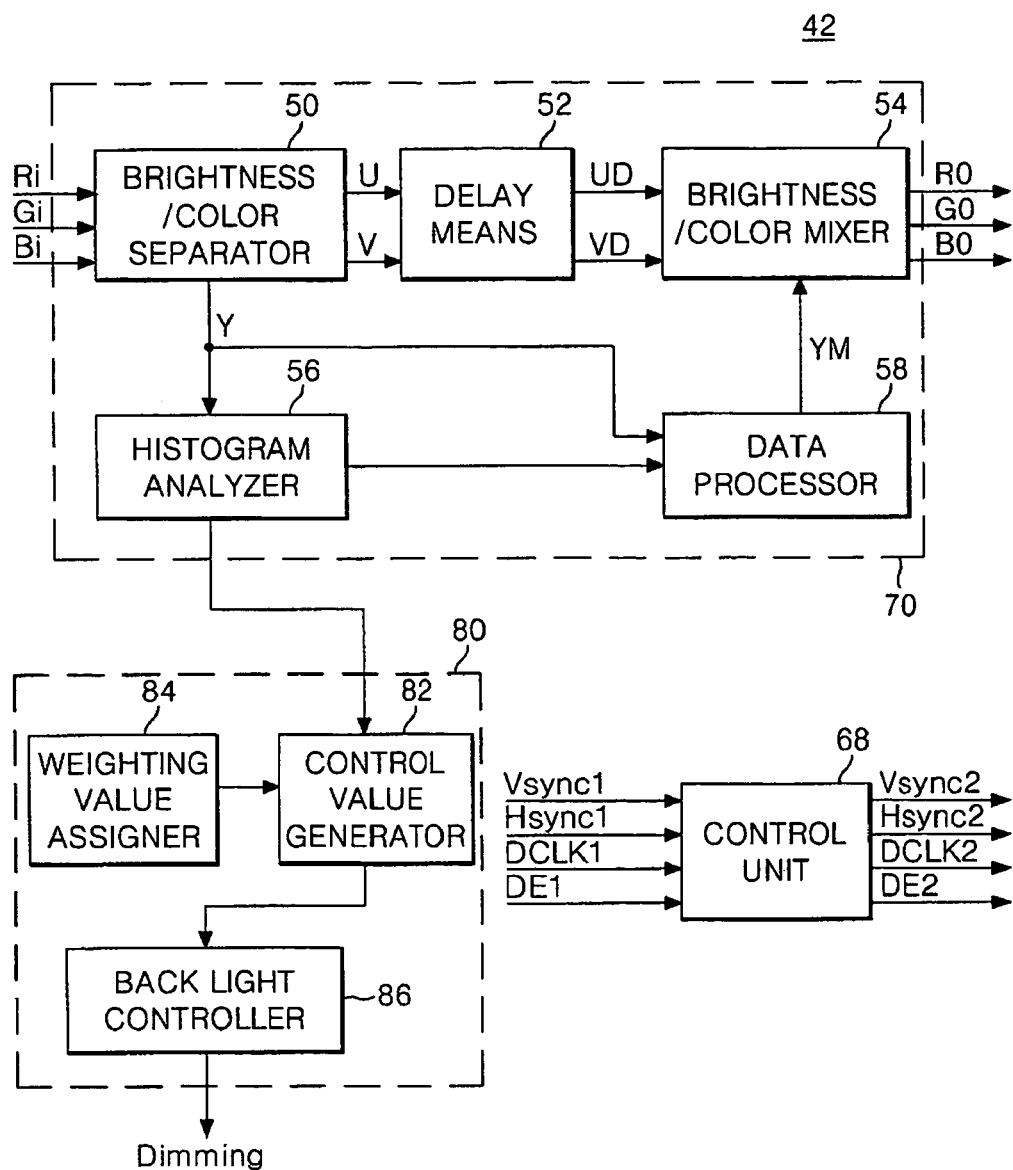
FIG. 8 is a block diagram of a picture quality enhancer according to another embodiment of the present invention.

FIG. 8 illustrates a picture quality enhancer 42 according to another embodiment of the present invention. Elements in FIG. 8 identical to those in FIG. 5 will be assigned by the same reference numerals and described briefly below.

Referring to FIG. 8, the picture quality enhancer 42 according to another embodiment of the present invention includes an image signal modulator 70 for generating second data Ro, Go and Bo using first data Ri, Gi and Bi, a back light control unit 80 for generating a brightness control signal Dimming under control of the image signal modulator 70, and a control unit 68 for generating second vertical/horizontal synchronizing signals Vsync2 and Hsync2, a second clock signal DCLK2 and a second enable signal DE2.

The image signal modulator 70 extracts brightness components Y from the first data Ri, Gi and Bi, and generates second data Ro, Go and Bo in which a contrast is partially emphasized with the aid of the extracted brightness components Y. To this end, the image signal modulator 70 includes a brightness/color separator 50, a delay 52, a brightness/color mixer 54, a histogram analyzer 56 and a data processor 58.

The brightness/color separator 50 separates the first data Ri, Gi and Bi into brightness components Y and chrominance components U and V with the aid of the above equations (1) through (3). The histogram analyzer 56 divides the brightness components Y into gray levels for each frame to generate a histogram. The data processor 58 generates modulated brightness components YM having an emphasized contrast using the analyzed histogram from the histogram analyzer 56.

The delay 52 delays chrominance components U and V until the brightness components YM modulated by the data processor 58 are produced. Then, the delay 52 applies the delayed chrominance components UD and VD synchronized with the modulated brightness components YM to the brightness/color mixer 54. The brightness/color mixer 54 generates second data Ro, Go and Bo with the aid of the modulated brightness components YM and the delayed chrominance components UD and VD. In this case, since the second data Ro, Go and Bo has been produced from the modulated brightness components YM having an expanded contrast, they have more expanded contrast than the first data Ri, Gi and Bi. The second data Ro, Go and Bo produced from the brightness/color mixer 54 is applied to the timing controller 30.

The control unit 68 receives the first vertical/horizontal synchronizing signals Vsync1 and Hsync1, the first clock signal DCLK1 and the first data enable signal DE1 from the system 40. Further, the controller 68 generates the second vertical/horizontal synchronizing signals Vsync2 and Hsync2, the second clock signal DCLK2 and the second data enable signal DE2 in such a manner to be synchronized with the second data Ro, Go and Bo, and applies them to the timing controller 30.

The back light control unit 72 extracts a control value from the histogram analyzer 56, and generates a brightness control signal Dimming using the extracted control value. Herein, the control value is generated by a plurality of image determination factors.

To this end, the back light control unit 80 includes a weighting value assigner 84, a control value generator 82 and a back light controller 86. The control value generator 82 extracts a plurality of image determination factors from the histogram produced by the histogram analyzer 56. The histogram determination factors include an average value, a most-frequent value, a middle-position value, an intermediate value, a maximum value, a minimum value and a range value of the histogram.

The average value is the average value of the histogram gray levels, i.e., the average value of gray levels for one frame. The most-frequent value is the most numerous gray level value in the frame. The middle-position value is the value located at the middle portion when the gray level values appearing in the histogram are listed in accordance with the frequency number thereof. For instance, if the gray levels in the histogram having a gray level '1' three times, a gray level '2' once, a gray level '3' twice and a gray level '4' once are listed in the frequency number thereof, then a value of "1112334" appears. Since a value positioned at the middle portion is '2', the middle-position value is selected as '2'. The intermediate value is an intermediate gray level value appearing between the maximum gray level value and the minimum gray level value. The maximum value is a maximum gray level value appearing in the histogram. The minimum value is a minimum gray level value appearing in the histogram. The range value is the range of the gray level values appearing in the histogram and is obtained by subtracting the minimum value from the maximum value.

The weighting value assigner 84 assigns a predetermined weighting value to a plurality of image determination factors extracted by the control value generator 82. In this case, the weighting value assigner 84 assigns a high weighting value to determination factors that more appropriately represent a characteristic of the image such that an optimum control value can be extracted.

For instance, the weighting value assigner 84 assigns a high weighting value (of, for example, 1.15) for the average value and the most-frequent value while assigning a middle weighting value for the range value. Further, the weighting value assigner 84 assigns a low weighting value to the maximum value, the minimum value, the middle-position value and the intermediate value. Weighting values assigned for those characteristics of the histogram having similar types of weighting values (e.g. high, middle, low) can be equal or different with respect to each other. This is to say that, for example, the weighting values assigned to the average value and the most-frequent value, both of which have high weighting values, may both be 1.15 or only one may be 1.15 and the other may be a different high value.

Further, the weighting value assigner 84 assigns a middle weighting value (e.g. a weighting value of 1.1) to the range value representing a characteristic of range in the histogram. Moreover, the weighting value assigner 84 can assign a low weighting value (e.g., a weighting value of 0.9) to the maximum value, the minimum value, the middle-position value and the intermediate value.

After weighting values are assigned to the image determination factors, the control value generator 82 generates a control value by summing all of the determination factors assigned with the weighing values and dividing the summed value by the number of determination factors. For example, if values of the determination factor assigned with the weighting value have a most-frequent value of 100, an average value of 90, a range value of 130, a maximum value of 200, a minimum value of 70, a middle-position value of 104 and an intermediate value of 140, then the control value generator 82 generates a control value of 117 and applies it to the back light controller 86.

The back light controller 86 generates a brightness dimming signal Dimming such that a light having brightness corresponding to the control value can be supplied, and then applies it to the inverter 36.

Figure 9A:
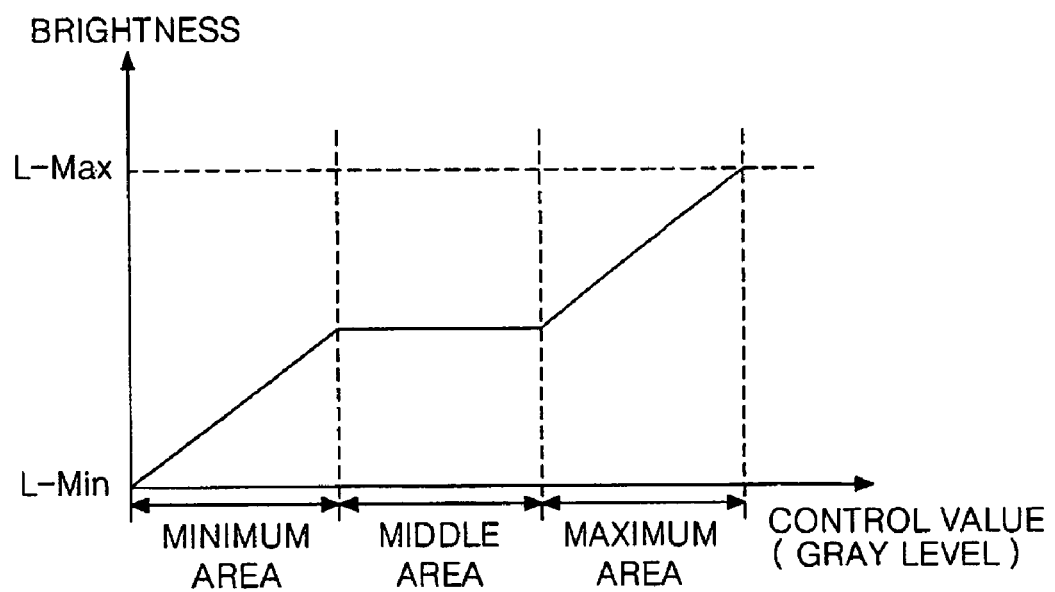
FIG. 9A and FIG. 9B are graphs representing a procedure of controlling brightness in response to a control value from the back light controller shown in FIG. 8.

In this case, the back light controller 86 linearly increases/decreases turn-on times of the back lights 38a to 38i in correspondence with the gray level of the control value when the control value is located in the minimum area as shown in FIG. 9A, that is, in proportion to a gray level. For instance, when the control value is positioned at the minimum area, the back light controller 86 can set turn-on times of the back lights 38a to 38i to a first time T1 as shown in FIG. 7A. If turn-on times of the back lights 38a to 38i are relatively small when the control value is positioned in the minimum area, then it becomes possible to minimize the motion blur (i.e., to increase turn-off times of the back lights) and display an image having a low brightness on the liquid crystal display panel 22.

Further, the back light controller 86 sets turn-on times of the back lights 38a to 38i to be relatively large when the control value is positioned in the maximum area. Moreover, the back light controller 86 linearly increases/decreases turn-on times of the back lights 38a to 38i in correspondence with the gray level of the control value, that is, in proportion to the gray level when the control value is positioned in the maximum area. For instance, when the control value is positioned at the maximum area, the back light controller 86 can set turn-on times of the back lights 38a to 38i to a second time interval T2. If turn-on times of the back lights 38a to 38i are set to a relatively long time when the control value is positioned in the maximum area, then it becomes possible to display an image having a high brightness in correspondence with the data.

In addition, the back light controller 86 sets turn-on times of the back lights 38a to 38i to a value between a turn-on time in the minimum area and a turn-on time in the maximum area when the control value is positioned in the middle area. Further, the back light controller 86 controls the back lights 38a to 38i to always have a constant turn-on time irrespective of the gray level of the control value. For instance, when the control value is positioned at the middle area, the back light controller 86 can set turn-on times of the back lights 38a to 38i to have a turn-on time during a time between the first interval T1 and the second interval T2. Meanwhile, in the present embodiment, gray level values in the minimum area, the middle area and the maximum area are experimentally determined such that a vivid image can be implemented. In other words, the gray level values in the minimum area, the middle area and the maximum area are experimentally determined in consideration of length (i.e., in inches, cm or other units), resolution and installation equipment, etc. of the liquid crystal display panel. Herein, the back light controller 64 shown in FIG. 5 also can control turn-on times of the back lights as shown in FIG. 9A.

Figure 9B:
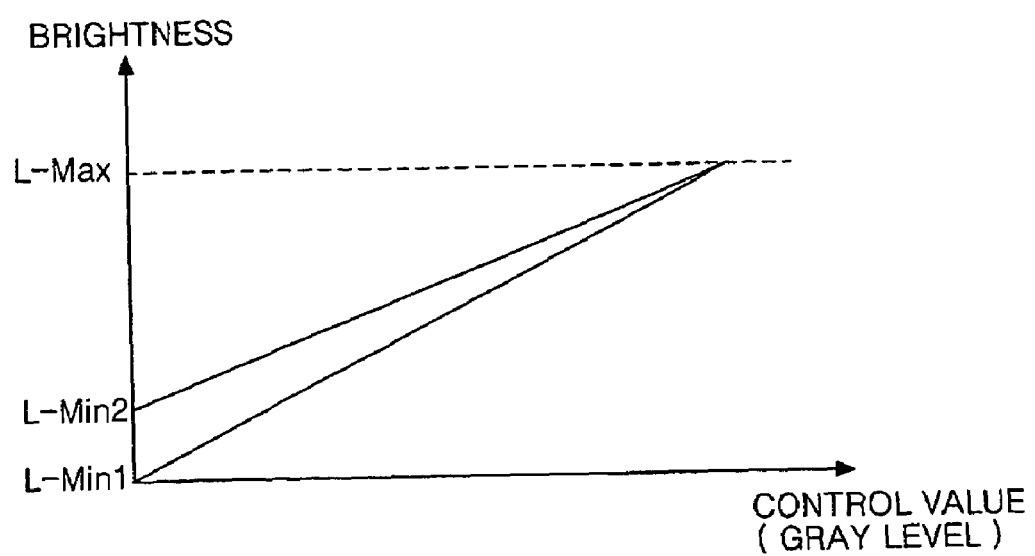

Alternatively, the back light controller 86 can generate a brightness control signal Dimming such that turn-on time of the back lights 38a to 38i can be increased or decreased in proportion to the gray level of the control value as shown in FIG. 9B. Minimum brightness values (or minimum turn-on times) L-min1 and L-min2 that can be controlled by the back light controller 86 are experimentally set.

The inverter 36 sequentially turns on and off the back lights 38a to 38i while controlling turn-on times of the back lights 38a to 38i in response to the brightness control signal Dimming.

As described above, according to the present invention, the histogram is produced with the aid of brightness components for one frame and the second data having an emphasized contrast, so that it becomes possible to display a vivid image. Furthermore, according to the present invention, a control value is extracted from the histogram and turn-on times of the back lights are controlled with the aid of the control value (i.e., brightness is controlled), so that it becomes possible to form a dynamic and fresh image. Moreover, according to the present invention, the back lights are sequentially turned on, thereby minimizing motion blur.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention.

Accordingly, the scope of the invention shall be determined only by the appended claims and their equivalents.

What is claimed is:

1. A method of driving a liquid crystal display having a liquid crystal display panel and a plurality of lamps that overlap with the liquid crystal display panel, the method comprising:
   (A) converting data into brightness components to produce a histogram for each frame;
   (B) extracting a control value from the histogram;
   (C) controlling turn-on times of the plurality of lamps dependent upon the control value; and
   wherein (B) includes:
   extracting a plurality of image determination factors from the histogram;
   assigning a weighting value to the image determination factors; and
   generating the control value using the image determination factors to which the weighting value has been assigned.

2. The method of claim 1, further comprising increasing the turn-on times of the lamps as a gray level of the control value increases and decreasing the turn-on times of the lamps as the gray level of the control value decreases.

3. The method of claim 1, wherein (C) includes dividing a range of gray levels into which a gray level of the control value may fall into a plurality of areas and setting the turn-on times of the lamps for each area to different values.

4. The method of claim 3, further comprising dividing the areas into a minimum area including low gray levels, a middle area including middle gray levels and a maximum area including high gray levels.

5. The method of claim 4, further comprising setting the turn-on times of the lamps to a first time interval when the control value is positioned in the middle area.

6. The method of claim 5, further comprising turning on the lamps during a time shorter than the first time interval when the control value is positioned in the minimum area.

7. The method of claim 6, further comprising controlling the turn-on time in proportion to the gray level of the control value when the control value is positioned in the minimum area.

8. The method of claim 5, further comprising turning on the lamps during a time longer than the first time interval when the control value is positioned in the maximum area.

9. The method of claim 6, further comprising controlling the turn-on time in proportion to the gray level of the control value when the control value is positioned in the maximum area.

10. The method of claim 1, further comprising sequentially turning on the lamps.

11. The method of claim 1, further comprising selecting the control value from an average value representing an average gray level of the histogram or a most-frequent value representing the most numerous gray level of the histogram.

12. The method of claim 11, further comprising determining a frequency of the most-frequent value and selecting the most-frequent value of a previous histogram or the most-frequent value of the present histogram.

13. The method of claim 12, further comprising selecting the previous most-frequent value as the control value when the frequency of the current most-frequent value is less than 40% of a total number of values in the frame and otherwise selecting the current most-frequent value.

14. The method of claim 1, further comprising:
   determining a maximum gray level value of the histogram and a minimum gray level value of the histogram;
   subtracting the minimum value from the maximum value to determine a range and a range value of the gray level values appearing in the histogram;
   listing the gray level values from the minimum value to the maximum value in a list, duplicating particular gray level values in the list dependent on the frequency in the histogram, and determining a median gray level value of the list; and
   using as the image determination factors: an average value of the histogram gray level, a most-frequent value representing the most numerous gray level in the histogram, the maximum gray level value, the minimum gray level value of the histogram, the range value, an intermediate value between the maximum gray level value and the minimum gray level value, and the median gray level value.

15. The method of claim 14, wherein assigning the weighting value includes:
   assigning a high weighting value to the average value and the most-frequent value;
   assigning a weighting value lower than the average value and the most-frequent value to the range value; and
   assigning a weighting value lower than the range value to the minimum gray level value, the maximum gray level value, the median value and the intermediate value.

16. The method of claim 14, wherein generating the control value includes generating the control value by summing the image determination factors to which the weighting values have been assigned and then dividing the summed value by the number of image determining factors.

17. The method of claim 1, further comprising:
   generating modulated brightness components having an expanded contrast using the histogram; and
   generating output data using the modulated brightness components.

18. A driving apparatus for a liquid crystal display, comprising:
   a brightness/color separator for converting inputted data into brightness components and chrominance components;
   a histogram analyzer for converting the brightness components into a histogram for each frame;
   a back light control unit for controlling turn-on times of a plurality of lamps using the analyzed histogram from the histogram analyzer;
   a control value generator for extracting a plurality of image determination factors from the histogram and for generating a first control value using the image determination factors;
   a weighting value assigner for assigning a weighting value to the plurality of image determination factors; and
   a back light controller for generating a second control value using the image determination factors in correspondence with the first control value.

19. The driving apparatus of claim 18, further comprising an inverter for controlling the turn-on times of the plurality of lamps in response to a brightness control signal from the back light control unit.

20. The driving apparatus of claim 19, wherein the inverter sequentially turns on the plurality of lamps.

21. The driving apparatus of claim 18, wherein the back light control unit includes:
   a control value extractor for extracting a control value from the histogram; and a back light controller for generating a brightness control signal in correspondence with the extracted control value from the control value extractor.

22. The driving apparatus of claim 21, wherein the back light controller generates the brightness control signal such that the turn-on times of the lamps increase as a gray level of the control value increases and decrease as the gray level of the control value decreases.

23. The driving apparatus of claim 21, wherein the back light controller generates the brightness control signal such that a gray level of the control value falls into one of a plurality of areas and the turn-on times of the lamps is different for each area.

24. The driving apparatus of claim 23, wherein the back light controller divides the areas into a minimum area of low gray levels, a middle area of middle gray levels and a maximum area of high gray levels.

25. The driving apparatus of claim 24, wherein, when the control value from the control value extractor is positioned in the middle area, the back light controller generates the brightness control signal such that the turn-on times of the lamps are set to a first time interval.

26. The driving apparatus of claim 25, wherein, when the control value from the control value extractor is positioned in the minimum area, the back light controller generates the brightness control signal such that the lamps are turned on during a time shorter than the first time interval.

27. The driving apparatus of claim 26, wherein, when the control value from the control value extractor is positioned in the maximum area, the back light controller generates the brightness control signal such that the turn-on time is controlled in proportion to the gray level of the control value.

28. The driving apparatus of claim 25, wherein, when the control value from the control value extractor is positioned in the maximum area, the back light controller generates the brightness control signal such that the lamps are turned on during a time longer than the first time interval.

29. The driving apparatus of claim 28, wherein, when the control value is positioned in the maximum area, the back light control unit generates the brightness control signal such that the turn-on time is controlled in proportion to a gray level of the control value.

30. The driving apparatus of claim 21, wherein the control value extractor extracts a most-frequent value representing a most numerous gray level in the histogram.

31. The driving apparatus of claim 30, wherein, the control value extractor selects a previous most-frequent value as the control value when the frequency of a currently extracted most-frequent value is less than 40% of the total number of values in the frame and otherwise selects the currently extracted most-frequent value as the control value.

32. The driving apparatus of claim 18, wherein the control value generator extracts an average value representing an average of the histogram gray level, a most-frequent value representing a most numerous gray level in the histogram and a median gray level value of the histogram from a list of gray level values listed from a minimum gray level value to a maximum gray level value in which particular gray level values are duplicated dependent on the frequency in the histogram, the image determination factors include a middle-position value located at a median of the list, the maximum gray level value of the histogram, the minimum gray level value of the histogram, a range value representing a range between the maximum gray level value and the minimum gray level value and an intermediate value between the maximum gray level value and the minimum gray level value.

33. The driving apparatus of claim 32, wherein the weighting value assigner assigns a high weighting value to the average value and the most-frequent value; a weighting value lower than the average value and the most-frequent value to the range value; and a weighting value lower than the range value to the minimum gray level value, the maximum gray level value, the middle-position value and the intermediate value.

34. The driving apparatus of claim 18, wherein the control value generator generates the first control value by summing the image determination factors to which the weighting values have been assigned and then dividing the summed value by the number of the image determining factors.

35. The driving apparatus of claim 18, further comprising:
  a data processor for generating modulated brightness components having an expanded contrast using the analyzed histogram from the histogram analyzer;
  delay means for delaying the chrominance components until the modulated brightness components are generated from the data processor; and
  a brightness/color mixer for generating output data using the modulated brightness components and the delayed chrominance components from the delay means.

36. A method of driving a plurality of lamps in a liquid crystal display during display of a frame, the method comprising:
  converting data for display into brightness components;
  extracting a control value from a statistic of the brightness components;
  controlling turn-on times of the plurality of lamps dependent upon the control value;
  extracting a plurality of image determination factors from the statistics;
  assigning a weighting value to the image determination factors to form weighted determination factors; and
  generating the control value using the weighted image determination factors.

37. The method of claim 36, further comprising setting equal turn-on times for the lamps.

38. The method of claim 36, further comprising setting different turn-on times for the lamps.

39. The method of claim 36, further comprising tuning on the lamps sequentially from one end of the liquid crystal display to an opposing end of the liquid crystal display.

40. The method of claim 36, further comprising altering the data before displaying the altered data to expand a contrast of the display.

41. The method of claim 36, further comprising controlling the turn-on times of the lamps to be proportional to the control value.

42. The method of claim 36, further comprising establishing minimum and maximum turn-on times of the lamps beyond which the turn-on times of the lamps are constant irrespective of the control value.

43. The method of claim 36, further comprising dividing a range of values into which the control value may fall into a plurality of areas in which dependency of the turn-on times of the plurality of lamps on the control value differs between areas.

44. The method of claim 43, further comprising setting the turn-on times to be proportional to the control value in one of the areas.

45. The method of claim 44, further comprising setting the turn-on times to be proportional to the control value in multiple areas.

46. The method of claim 43, further comprising setting the turn-on times to a constant value irrespective of the control value in a first of the areas.

47. The method of claim 46, further comprising setting the turn-on times to be proportional to the control value in a second of the areas.

48. The method of claim 46, further comprising setting the turn-on times to be proportional to the control value in multiple areas.

49. The method of claim 48, further comprising surrounding the first area by the multiple areas.

50. The method of claim 36, further comprising comparing a particular statistic of the frame to a similar particular statistic of a previous frame and selecting one of the particular statistics to determine the control value.

51. The method of claim 50, further comprising selecting the particular statistic used to determine the control value based solely on characteristics of the particular statistic of the frame.

52. The method of claim 36, further comprising:
extracting a plurality of image determination factors from the statistics;
assigning a weighting value to the image determination factors to form weighted determination factors; and
generating the control value using the weighted image determination factors.

53. The method of claim 36, further comprising summing the weighted image determination factors and then dividing the summed value by the number of image determining factors to generate the control value.

54. The method of claim 36, further comprising:
generating modulated brightness components having an expanded contrast using the statistics; and
generating output data using the modulated brightness components.

55. The method of claim 54, further comprising setting dependency of the turn-on times to be a constant value independent of the control value in one of the areas.

56. A method of driving a plurality of lamps in a liquid crystal display during display of a frame, the method comprising:
(A) converting data for display into brightness components;
(B) extracting a control value from a statistic of the brightness components;
(C) controlling turn-on times of the plurality of lamps dependent upon the control value; and
(D) dividing a range of values into which the control value may fall into a plurality of areas in which dependency on the control value of the turn-on times of the plurality of lamps differs between areas;
wherein (B) includes:
extracting a plurality of image determination factors from histogram of each frame;
assigning a weighting value to the image determination factors; and
generating the control value using the image determination factors to which the weighting value has been assigned.

57. The method of claim 56, further comprising setting equal turn-on times for the lamps.

58. The method of claim 56, further comprising setting different turn-on times for the lamps.

59. The method of claim 56, further comprising tuning on the lamps sequentially from one end of the liquid crystal display to an opposing end of the liquid crystal display.

60. The method of claim 56, further comprising setting dependency of the turn-on times to be proportional to the control value in one of the areas.

61. The method of claim 56, further comprising comparing a particular statistic of the frame to a similar particular statistic of a previous frame and selecting one of the particular statistics to determine the control value.

62. The method of claim 61, further comprising selecting the particular statistic used to determine the control value based solely on characteristics of the particular statistic of the frame.

63. A method of driving a plurality of lamps in a liquid crystal display during display of a frame, the method comprising:
converting data for display into brightness components;
extracting image determination factors from statistics of the brightness components;
assigning a weighting value to the image determination factors to form weighted determination factors;
generating a control value using the weighted image determination factors; and
controlling turn-on times of the plurality of lamps dependent upon the control value.

64. The method of claim 62, further comprising summing the weighted image determination factors and then dividing the summed value by the number of image determining factors to generate the control value.

65. The method of claim 62, further comprising setting equal turn-on times for the lamps.

66. The method of claim 62, further comprising setting different turn-on times for the lamps.

67. The method of claim 62, further comprising tuning on the lamps sequentially from one end of the liquid crystal display to an opposing end of the liquid crystal display.

68. The method of claim 62, further comprising establishing minimum and maximum turn-on times of the lamps beyond which the turn-on times of the lamps are constant irrespective of the control value.

69. The method of claim 62, further comprising comparing a particular statistic of the frame to a similar particular statistic of a previous frame and selecting one of the particular statistics to determine the control value.

70. The method of claim 68, further comprising selecting the particular statistic used to determine the control value based solely on characteristics of the particular statistic of the frame.

* * * * *